May 27, 1958 T. WILL 2,836,661

LUMINOUS TELEPHONE DIAL INDICATOR

Filed July 18, 1955 2 Sheets-Sheet 1

INVENTOR.
THEODORE WILL
BY
Zoltan Polachek
ATTORNEY

May 27, 1958 T. WILL 2,836,661

LUMINOUS TELEPHONE DIAL INDICATOR

Filed July 18, 1955 2 Sheets-Sheet 2

INVENTOR.
THEODORE WILL
BY [signature]
ATTORNEY

Patented May 27, 1958

2,836,661

LUMINOUS TELEPHONE DIAL INDICATOR

Theodore Will, Hollis, N. Y., assignor to Fund-Del Inc., Syosset, N. Y., a corporation of New York Application July 18, 1955, Serial No. 522,717

7 Claims. (Cl. 179—90)

This invention relates to new and useful improvements in telephone dial devices.

More particularly, the present invention proposes the construction of an improved telephone dial device which can easily and quickly be attached to a telephone dial without special tools and which will permit a person to dial the operator at night or when the dial is not readily visible or quickly in an emergency.

As a further object, the present invention proposes forming the device in the form of a clip having an outwardly extending finger hook which can be easily found by touch or sight and which will permit the dial to be turned so as to dial the operator.

Still further, the present invention proposes constructing the clip so that the finger hook is offset from the dial overlying portion of the clip and below it for the finger hook to be disposed for convenient operation yet out of the way and closely adjacent the base of the telephone.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 3, 4, 5, 6:
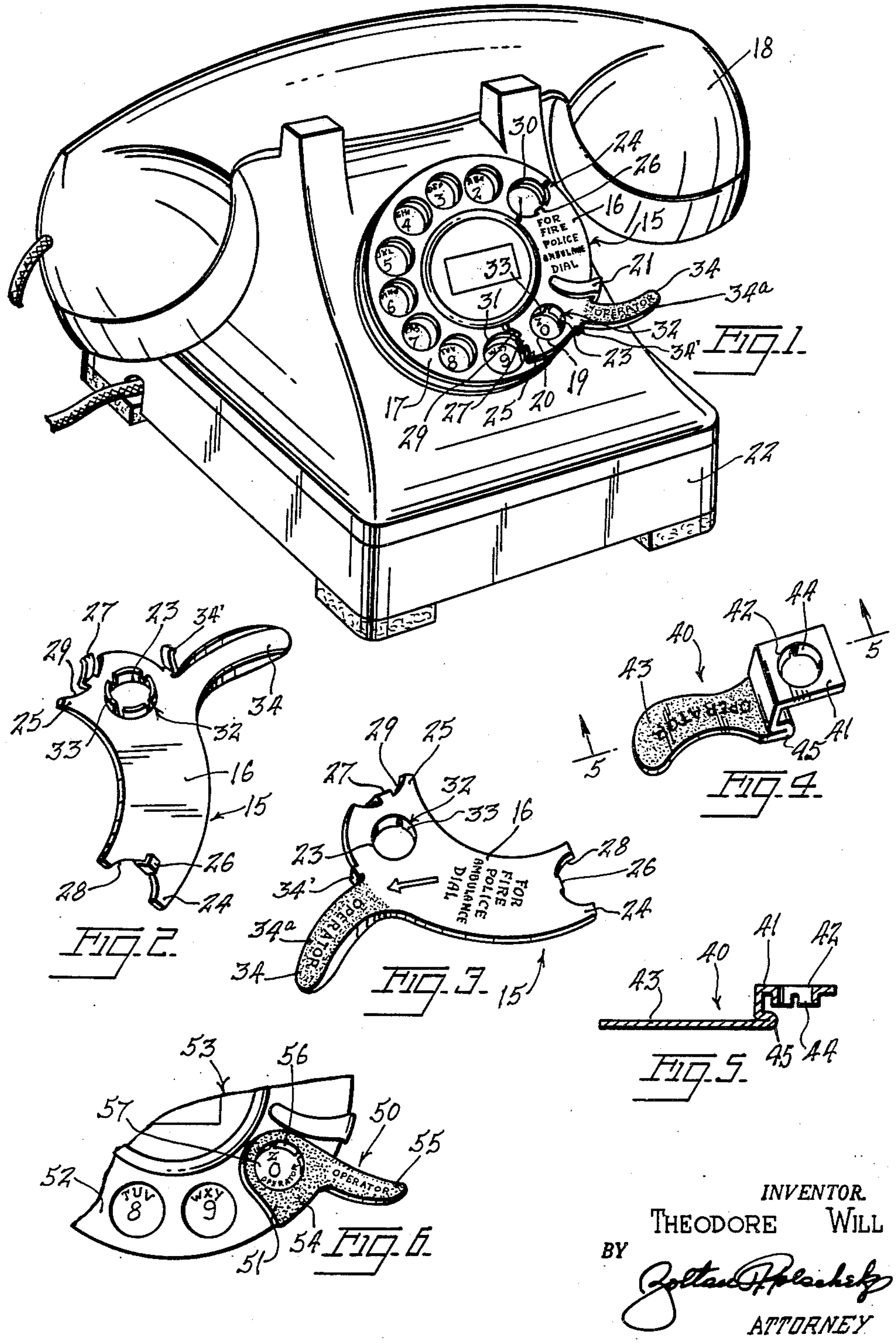
Fig. 1 is a perspective view of a dial telephone having a telephone dial device constructed and arranged in accordance with the present invention.
Fig. 2 is a perspective view of the telephone dial device shown in Fig. 1 but showing the bottom of the device.
Fig. 3 is a view similar to Fig. 2 but showing the top of the device.
Fig. 4 is a view similar to Fig. 3 but illustrating a modification of the present invention.
Fig. 5 is a sectional view taken on line 5—5 of Fig. 4.
Fig. 6 is a fragmentary view similar to Fig. 1 but illustrating another modification of the present invention.

The telephone dial device, in accordance with the first form of the invention illustrated in Figs. 1 to 3, inclusive, is a clip 15 which may be made of metal, plastic or similar material.

Clip 15 has a body portion 16 adapted to overlie the top part of a telephone dial 17 of a dial telephone 18 adjacent the starting point 19 on the dial 17 for dialing the operator. On dial telephone 18 shown in Fig. 1 this point 19 is the last finger opening 20 adjacent the finger stop 21 secured to the base 22 of the telephone and extending over the dial 17.

Body portion 16 of clip 15 has a finger opening 23 adapted to coincide with finger opening 20 on dial 17 when the clip is mounted on the dial. Dial portion 16 is arcuate in shape and of the same curvature as the dial 17 with two ends 24 and 25.

Dial finger opening engaging members or clamps 26 and 27 are disposed at the ends 24 and 25 respectively of the dial portion 16 of clip 15. The ends 24 and 25 have arcuate portions 28 and 29 to fit around finger openings 30 and 31 respectively of the dial 17 and the members or clamps 26 and 27 are disposed at the center of these arcuate portions 28 and 29. The body portion 16 of clip 15 is adapted to underlie the finger stop 21 and rest on top of the dial 17 when the dial is in its normal position shown in Fig. 1.

In addition, another finger opening engaging member or clamp 32 in the form of downwardly extending spring projection 33 is provided on the body portion 16 of clip 15 at the periphery of the finger opening 23.

A flat finger hook 34 extends from the body portion 16 of clip 15 and is so positioned on the clip as to extend outwardly of dial 17 when the clip 15 is secured to the dial. The finger hook 34 extends outwardly from the point 19 on the dial when the clip is mounted on the dial and is arcuately curved for ready operation (as shown in Fig. 1), when the dial finger opening engaging members are each engaging a dial finger opening on the dial 17.

Since the finger hook 34 extends beyond the edge or periphery of the dial it is easily found either by touch or sight for quickly dialing the operator.

The outer surface $34^a$ of the hook 34 may be coated with luminous paint or other material, or any other portion of the clip may be similarly coated for night use. An additional clamp 34′ is provided at the base of the hook member 34 for clipping the device on the dial 17.

The modification of the invention illustrated in Figs. 4 and 5 is characterized by the provision of a clip 40 composed of a strip of metal having a body portion 41 adapted to cover only that part of a telephone dial immediately adjacent the dial finger opening in the dial at the starting point for dialing the operator.

Body portion 41 contains a finger opening 42 adapted to coincide with one of the finger openings on a telephone dial. The material of the clip is folded upon itself to form a shelf 45 and has an oppositely projecting portion forming an arcuate shaped finger hook 43. Means to secure the clip 40 to a telephone dial is provided by spring projections or dial finger opening engaging members 44 at the periphery of the finger opening 42 in the dial portion, and by snapping the shelf 45 over the peripheral edge of dial 17.

The modification of the invention illustrated in Fig. 6 of the drawing is characterized by the provision of a clip 50 having a body portion 51 adapted to overlie the top of a dial 52 of a dial telephone 53. The body portion 51 of clip 50 has an upper surface 54 coated with luminous paint or other material. A finger hook 55 extends from the body portion 51 of the clip 50 and is similarly coated as the body portion. Spring projections or dial finger opening engaging members 56 extend from the periphery of a finger opening 57 in the body portion 51 of clip 50 for attaching the clip to a dial.

Figures 7, 8, 9:
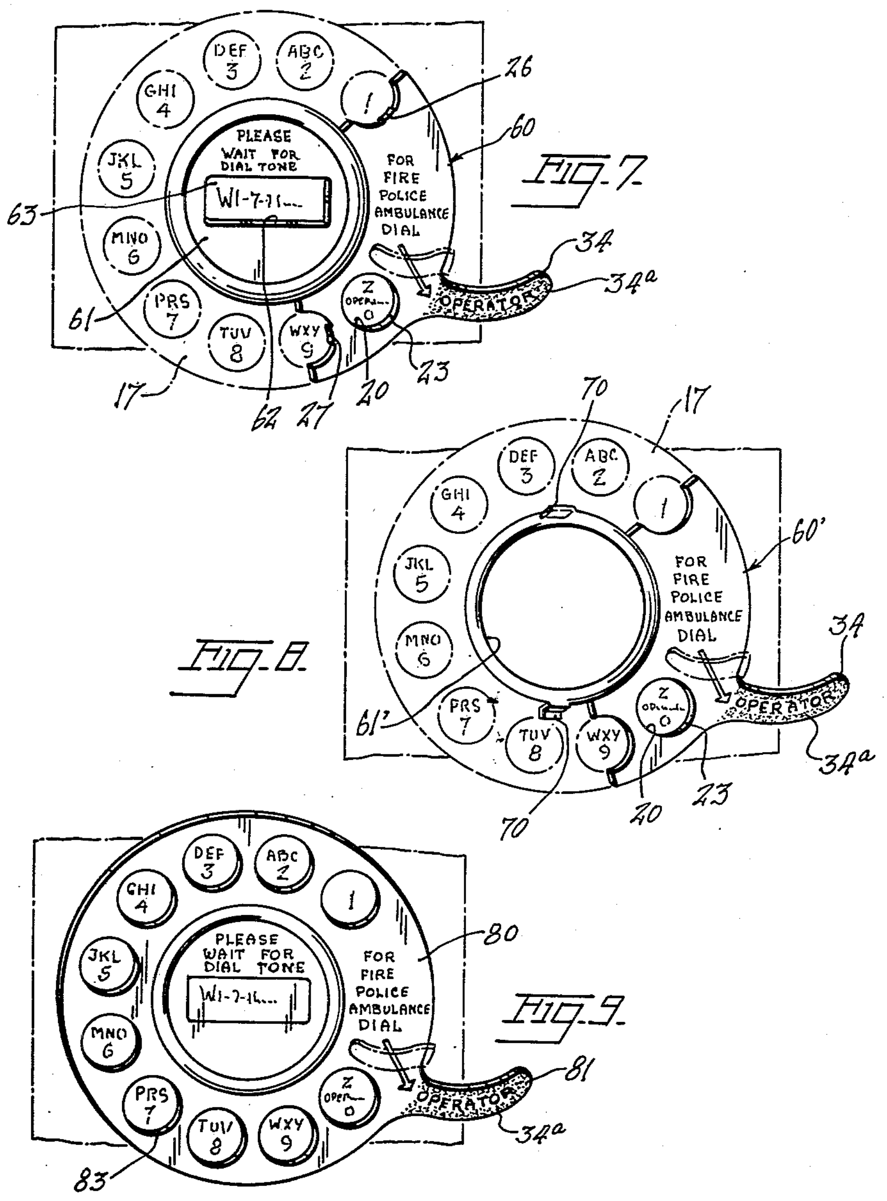
Fig. 7 is a top plan view of a telephone dial with a telephone dial device embodying still another modification of the invention applied thereto.
Fig. 8 is a similar view showing a further modified form of the invention.
Fig. 9 is a similar view showing a still further modification of the invention.

In the modified form of the invention shown in Fig. 7, the arcuate-shaped clip 60 has an integral disc-shaped extension 61 formed with a rectangular-shaped opening or window 62. The clip is applied to the telephone dial in the same manner as the clip 15 of the form of invention of Figs. 1 to 3, inclusive, with the disc-shaped extension 61 overlying the central disc-shaped ring window of the telephone dial and with the opening or window 62 thereof being aligned with the rectangular panel 63 of the telephone dial defining the space for the telephone number.

In all other respects, the form of invention shown in Fig. 7 is similar to the form of invention shown in Figs. 1 to 3, inclusive and similar reference numerals are used to indicate similar parts.

The modified clip 60' illustrated in Fig. 8 is made integral with a ring extension 61' which is formed with opposed prongs or clamps 70 depending from its periphery. In order to apply this form of clip to the telephone dial, the conventional central ringed disc-shaped window of the telephone dial may be manually removed by lifting the prongs of said window out of their socketed openings in the telephone dial and inserting the prongs or clamps 70 of the extension thereinto.

Referring now to the embodiment of the invention shown in Fig. 9, the improved dial shown herein has an annular or ring-shaped body portion 80 with the finger hook 81 formed integrally therewith. Openings 83 are formed around the body portion spaced to align with the spaced numbers on the telephone dial.

This dial may be substituted in place of the conventional telephone dial now in use, or secured over the present dial by any suitable means, such as clips, adhesive or the like.

In all other respects the form of the invention shown in Fig. 9 is similar to the form shown in Figs. 1 to 3, inclusive, and similar reference numerals are used to indicate similar parts.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A telephone dial device comprising a clip having an arcuate-shaped body portion adapted to overlie at least a part of a telephone dial, said body portion having a finger opening adapted to coincide with one of the finger openings on a telephone dial, means to secure the body portion to a telephone dial, and a finger hook extending from said body portion of the clip for disposal outwardly of a telephone dial when the body portion is secured to the dial, the upper surface of said hook being coated with luminous material.

2. A telephone dial device comprising a clip having an arcuate-shaped body portion adapted to overlie part of a telephone dial, said body portion having a finger opening adapted to coincide with one of the finger openings on a telephone dial, means to secure the body portion to a telephone dial, and a finger hook extending from said body portion of the clip for disposal outwardly of a telephone dial when the body portion is secured to the dial, said means to secure the body portion to a telephone dial being dial finger opening engaging members and said finger hook being positioned on the body portion adjacent the finger stop on a telephone dial when said dial finger opening engaging members are engaging dial finger openings on a telephone dial.

3. A telephone dial device comprising a clip having an arcuate-shaped body portion adapted to overlie part of a telephone dial said body portion having a finger opening adapted to coincide with one of the finger openings on a telephone dial, means to secure the body portion to a telephone dial, and a finger hook extending from said body portion of the clip for disposal outwardly of a telephone dial when the body portion is secured to the dial, said means to secure the body portion to a telephone dial being dial finger opening engaging members and said finger hook being positioned on the body portion adjacent the finger stop on a telephone dial when said dial finger opening engaging members are engaging dial finger openings on a telephone dial, one of said dial finger opening engaging members being disposed at one end of the body portion and another of said dial finger opening engaging members being disposed at another end of the body portion.

4. A telephone dial device comprising a clip having an arcuate-shaped body portion adapted to overlie part of a telephone dial said body portion having a finger opening adapted to coincide with one of the finger openings on a telephone dial, means to secure the body portion to a telephone dial, and a finger hook extending from said body portion of the clip for disposal outwardly of a telephone dial when the body portion is secured to the dial, said means to secure the body portion to a telephone dial being dial finger opening engaging members and said finger hook being positioned on the body portion adjacent the finger stop on a telephone dial when said dial finger opening engaging members are engaging dial finger openings on a telephone dial, said body portion of the clip being arcuate in shape with two ends and adapted to underlie the finger stop on a telephone dial, one of said dial finger opening engaging members being disposed at one of said ends of said body portion and another of said dial finger opening engaging members being disposed at the other of said ends of said body portion.

5. A telephone dial device comprising a clip having an arcuate-shaped body portion adapted to overlie part of a telephone dial said body portion having a finger opening adapted to coincide with one of the finger openings on a telephone dial, means to secure the body portion to a telephone dial, and a finger hook extending from said body portion of the clip for disposal outwardly of a telephone dial when the body portion is secured to the dial, said means to secure the body portion to a telephone dial being dial finger opening engaging members and said finger hook being positioned on the body portion adjacent the finger stop on a telephone dial when said dial finger opening engaging members are engaging dial finger openings on a telephone dial, said body portion of the clip being arcuate in shape with two ends and adapted to underlie the finger stop on a telephone dial, one of said dial finger opening engaging members being disposed at one of said ends of said body portion and another of said dial finger opening engaging members being disposed at the other of said ends of said body portion, and another of said dial finger opening engaging members being disposed on the body portion at the finger opening therein.

6. A telephone dial device comprising a clip having an arcuate-shaped body portion adapted to overlie part of a telephone dial said body portion having a finger opening adapted to coincide with one of the finger openings on a telephone dial, means to secure the body portion to a telephone dial, and a finger hook extending from said body portion of the clip for disposal outwardly of a telephone dial when the body portion is secured to the dial, said means to secure the body portion to a telephone dial being dial finger opening engaging members and said finger hook being positioned on the body portion adjacent the finger stop on a telephone dial when said dial finger opening engaging members are engaging dial finger openings on a telephone dial, said dial portion of the clip being adapted to cover only that part of a telephone dial immediately adjacent the dial finger opening adjacent the finger stop on a telephone dial, said finger opening engaging members being spring projections extending from the clip at the periphery of the finger opening in the body portion of the clip.

7. A telephone dial device comprising a clip having an arcuate-shaped body portion adapted to overlie part of a telephone dial said body portion having a finger opening adapted to coincide with one of the finger openings on a telephone dial, means to secure the body portion to a telephone dial, and a finger hook extending from said body portion of the clip for disposal outwardly of a telephone dial when the body portion is secured to the dial, said means to secure the body portion to a telephone dial being dial finger opening engaging members and said finger hook being positioned on the body portion adjacent the finger stop on a telephone dial when said dial finger opening engaging members are engaging dial finger openings on a telephone dial, said dial portion of the clip being adapted to cover only that part of a telephone dial immediately adjacent the dial finger opening adjacent the finger stop on a telephone dial, said finger opening engaging members being spring projections extending from the clip at the periphery of the finger opening in the body portion of the clip, said clip having an upper surface coated with luminous material.

References Cited in the file of this patent

UNITED STATES PATENTS 2,754,370 Gavreau ---------------- July 10, 1956